(12) United States Patent
Mitsuhashi et al.

(10) Patent No.: US 8,162,400 B2
(45) Date of Patent: Apr. 24, 2012

(54) CONNECTING APPARATUSES FOR VEHICULAR SEATS

(75) Inventors: Atsutaka Mitsuhashi, Aichi-ken (JP); Hideki Uramichi, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 358 days.

(21) Appl. No.: 12/509,535

(22) Filed: Jul. 27, 2009

(65) Prior Publication Data

US 2010/0052393 A1 Mar. 4, 2010

(30) Foreign Application Priority Data

Aug. 26, 2008 (JP) ................................. 2008-216515

(51) Int. Cl.
*B60N 2/02* (2006.01)
(52) U.S. Cl. ................ 297/362; 297/362.12; 297/367 R
(58) Field of Classification Search .................. 297/362, 297/362.12, 367 R
See application file for complete search history.

(56) References Cited

U.S. PATENT DOCUMENTS

| | | | | |
|---|---|---|---|---|
| 6,010,191 A * | 1/2000 | Calinaud et al. | ........... | 297/367 R |
| 7,380,882 B2 * | 6/2008 | Oki | ............ | 297/367 R |
| 7,384,101 B2 * | 6/2008 | Kawashima et al. | .......... | 297/362 |
| 7,497,520 B2 * | 3/2009 | Assmann | ................ | 297/367 R |
| 7,967,384 B2 * | 6/2011 | Hille et al. | ................ | 297/361.1 |
| 2006/0158013 A1 | 7/2006 | Kawashima et al. | | |
| 2006/0220430 A1 * | 10/2006 | Baloche Faurecia | ......... | 297/362 |
| 2009/0134682 A1 * | 5/2009 | Andou et al. | ............ | 297/362.12 |

FOREIGN PATENT DOCUMENTS

| | | |
|---|---|---|
| CN | 1799452 | 7/2006 |
| DE | 69401612 | 5/1997 |
| DE | 10150502 | 7/2002 |
| JP | 3991749 | 8/2007 |

OTHER PUBLICATIONS

English language Abstract of JP 2003-289973, Oct. 14, 2003.

* cited by examiner

*Primary Examiner* — Laurie Cranmer
(74) *Attorney, Agent, or Firm* — Greenblum & Bernstein, P.L.C.

(57) ABSTRACT

One aspect of the present invention can include a connecting apparatus for rotatably connecting a first and second object member of a vehicular seat relative to each other having a first and second connecting member and a holding member. The first and second connecting member are integrated in a direction of matching disks thereof to be able to rotate relative to each other. The first connecting member is integrally attached to the first object member. The second connecting member is integrally attached to the second object member. The holding member straddles outer peripheral surfaces of the first and second connecting member to hold the connecting members in a plate thickness direction. The holding member is provided with an opening portion. The first connecting member is provided with a protruding portion. The protruding portion extends through the opening portion in a radial direction, and the protruding portion is attached to the first object member.

4 Claims, 9 Drawing Sheets

CONNECTING APPARATUSES FOR VEHICULAR SEATS

This application claims priority to Japanese patent application serial number 2008-216515, the contents of which are incorporated herein by reference.

BACKGROUND OF THE INVENTION

1. Field of the Invention

The present invention relates to a connecting apparatus for a vehicular seat. In particular, the present invention relates to a connecting apparatus for rotatably connecting two object members of a vehicular seat relative to each other.

2. Description of the Related Art

A known vehicle seat has a seat back connected with a seat cushion via a reclining apparatus (connecting apparatus). Reclining angle of the seatback can be adjusted by manipulating the reclining apparatus. One example of the reclining apparatus is disclosed in Japanese Patent No. 3,991,749. The reclining apparatus has a disk shape ratchet and a disk shape guide. The ratchet is integrally attached to a frame of the seat back (back frame). The guide is integrally attached to a frame of the seat cushion (cushion frame). The ratchet and the guide are rotatably integrated relative to each other in a plate thickness direction.

The ratchet has cylindrical portions projecting in the plate thickness direction from the ratchet with cylindrical shapes. The back frame is penetrated to form with fitting holes in the plate thickness direction. The cylindrical portions are fit into the fitting holes, and the cylindrical portions are welded to the back frame. Thus, the ratchet is attached to the back frame.

Further, the reclining apparatus includes a holding member. The holding member covers outer peripheral surfaces of the ratchet and the guide. And the holding member holds the ratchet and the guide to stop detachment thereof in an axial direction.

There is need in the art for a connecting apparatus for a vehicular seat which can be strongly attached to an object member.

SUMMARY OF THE INVENTION

One aspect of the present invention can include a connecting apparatus for rotatably connecting first and second object members of a vehicular seat relative to each other having first and second connecting members and a holding member. The first and second connecting members are integrated in a direction of matching disks thereof to be able to rotate relative to each other. The first connecting member is integrally attached to the first object member. The second connecting member is integrally attached to the second object member. The holding member straddles outer peripheral surfaces of the first and second connecting members, and holds the connecting members to stop detachment thereof in a plate thickness direction. The holding member is provided with an opening portion. The first connecting member is provided with a protruding portion. The protruding portion extends through the opening portion in a radial direction, and the protruding portion is attached to the first object member.

Therefore, the first connecting member is attached to the first object member by the protruding portion. The protruding portion is located at a radial outer portion of the first connecting member. Thereby, the first connecting member may be strongly attached to the first object member because torque applied to the first connecting member via the protruding portion from the first object member is relatively large.

DETAILED DESCRIPTION OF THE INVENTION

Each of the additional features and teachings disclosed above and below may be utilized separately or in conjunction with other features and teachings to provide improved connecting apparatuses. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 2:
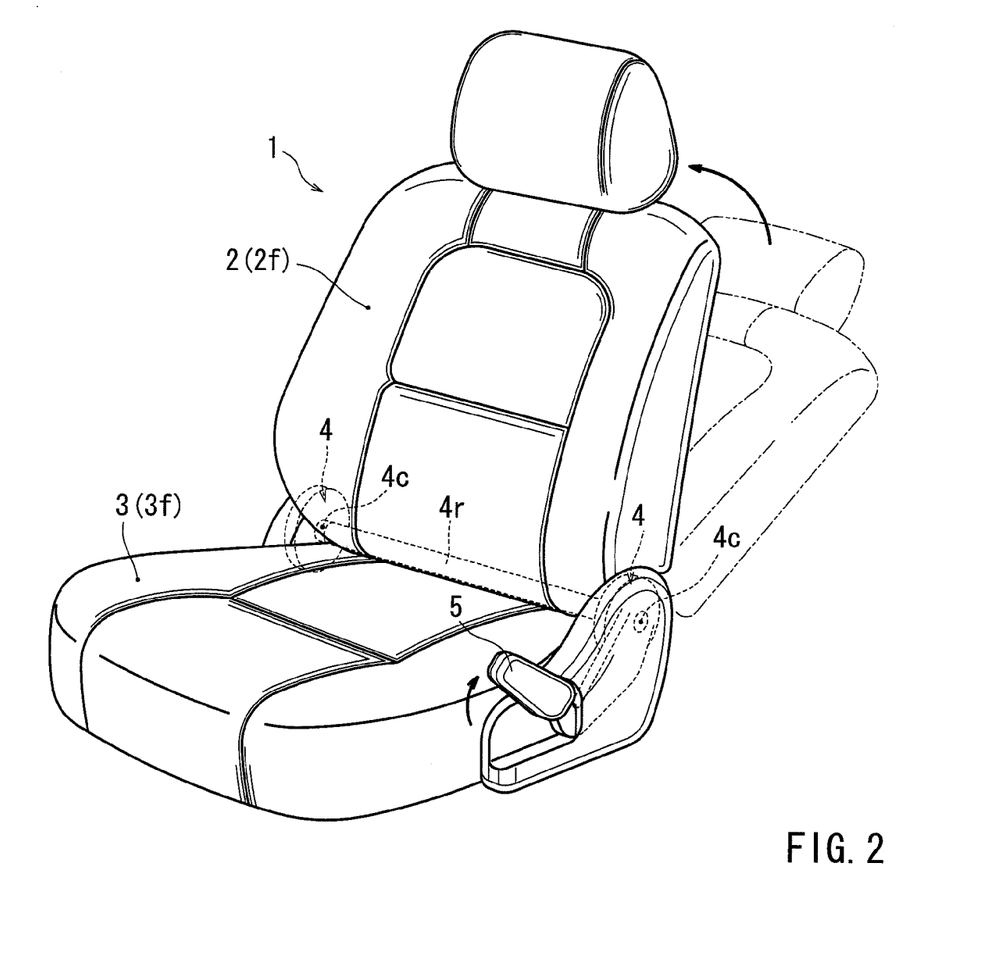
FIG. 2 is a perspective view of a vehicular seat.

As shown in FIG. 2, a vehicular seat 1 includes a seat back 2 constituting a back rest, a pair of left and right reclining apparatus (connecting apparatus) 4 arranged at the positions at lower portions of both sides of the seat back 2, and a seat cushion 3 constituting a seating portion connected to the seat back 2 by the reclining apparatuses 4.

The reclining apparatuses 4 include operating shafts 4c for switching operation of locking and releasing. The operating shafts 4c are connected integrally to each other by a connecting rod 4r. Thereby, at the respective reclining apparatuses 4, the switching operation of locking and releasing can respectively be carried out in synch. In the locking state, a back rest angle of the seat back 2 is fixed. In the releasing state, the back rest angle can be adjusted by releasing from the locking state. The respective reclining apparatuses 4 are normally maintained in the locking state by a bias force.

As shown in FIG. 2, according to the respective reclining apparatuses 4, the locking states can be released at the same time by pulling up an operating lever 5 provided at a position of a side portion of the seat cushion 3. Thereby, the back rest angle of the seat back 2 is released to bring about a state capable of carrying out an adjusting operation of the back rest angle. When the back rest angle of the seat back 2 is adjusted, and the operation of releasing the operating lever 5 is stopped, the respective reclining apparatuses 4 are brought back to the locking state by the bias member. Thereby, the seat back 2 is fixed to a position of the adjusted back rest angle.

The seat back 2 is biased always in a forward falling pivoting direction by a bias force of a bias spring, not illustrated, positioned between the seat back 2 and the seat cushion 3. Therefore, in a state in which a user does not sit on the vehicular seat 1, by releasing the state of locking the respective reclining apparatuses 4, the seat back 2 is able to fall forward by the bias spring to overlap an upper face portion of the seat cushion 3.

The respective reclining apparatuses 4 are brought back to the locking state by stopping the operation of releasing the operating lever 5 when the seat back 2 is disposed in an angle region used as a back rest. The reclining apparatuses 4 include lock zones and free zones within a rotational angle region. In the lock zones, the respective reclining apparatuses 4 are brought back to the locking state when the operation of releasing the operating lever 5 is stopped. In the free zones, the respective reclining apparatuses 4 are not brought back to the locking states even when the operation of releasing the operating lever 5 is stopped.

The lock zone is normally set to the angle region of using the seat back 2 as the back rest. Specifically, the lock zone is set to an angle region for making the seat back 2 fall to a rear side from an angle position at which the seat back 2 is brought into an upright attitude. On the other hand, the free zone is set to an angle region of a forward falling attitude at which the seat back 2 is not used as the back rest. Specifically, the free zone is set to an angle region of making the seat back 2 fall to a front side from the angle position of constituting the upright attitude.

Therefore, when the seat back 2 is made to fall forward, even by a small amount from the upright attitude by releasing the states of locking the respective reclining apparatuses 4, thereafter, even when the releasing operation is stopped, the seat back 2 is made to fall forward spontaneously to a position of folding the seat back 2 on the upper face portion of the seat cushion 3. Constitutions of the reclining apparatuses 4 will be explained in details as follows. The reclining apparatuses 4 are constructed by being approximately symmetric with each other in a left and right direction. Therefore, in the following, an explanation will be given only of the constitution of the reclining apparatus 4 on one side indicated on a right side of paper face of FIG. 2.

Figure 1:
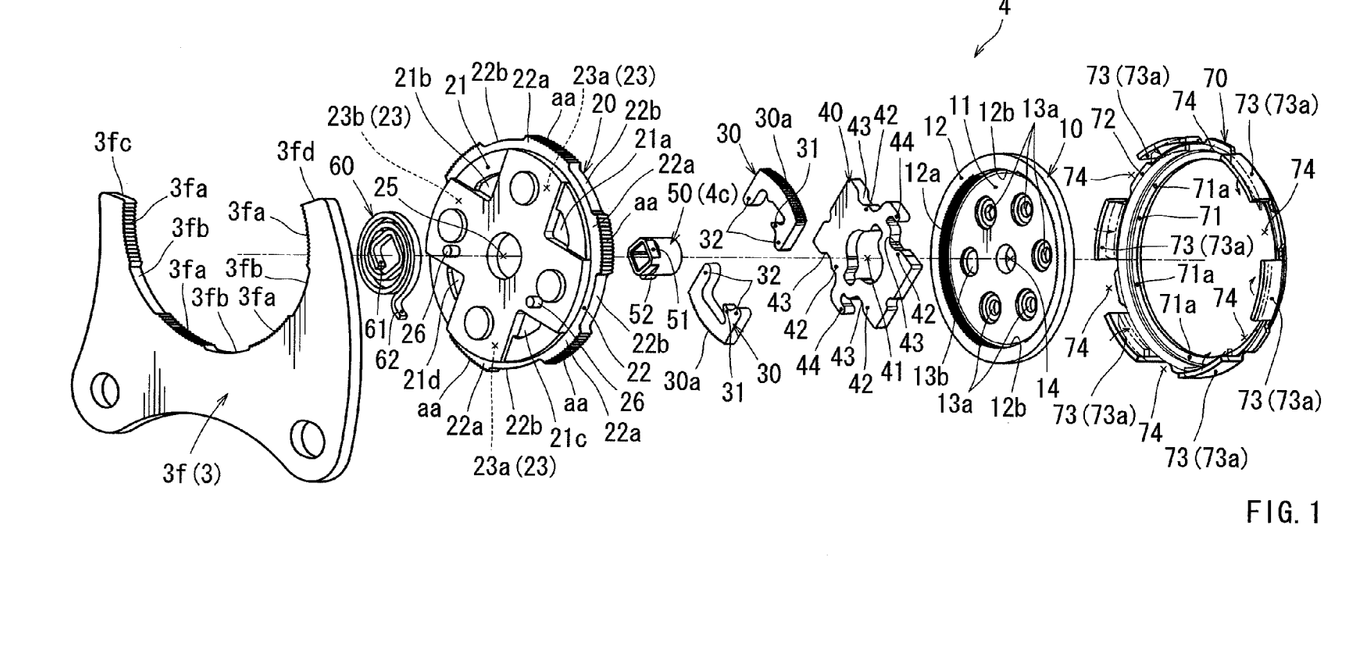
FIG. 1 is an exploded perspective view of a reclining apparatus of the present invention.

As shown in FIG. 1, the reclining apparatus 4 is constituted by integrating a ratchet 10, a guide 20, a pair of upper and lower poles 30, a slide cam 40, a hinge cam 50, a bias spring 60 and a holding member 70. The ratchet 10 and the guide 20 are formed in shapes of circular disks. The poles 30 and the slide cam 40 are arranged between circular disk faces of the ratchet 10 and the guide 20. The hinge cam 50 may operate to move the slide cam 40. The bias spring 60 may bias to pivot the hinge cam 50. The holding member 70 may hold the ratchet 10 and the guide 20 in a plate thickness direction (axial direction) to stop detachment thereof. The guide 20 constitutes a first connecting member, and the ratchet 10 constitutes a second connecting member.

The ratchet 10 includes a circular cylinder portion 12 which is projected from an outer peripheral end of the circular disk portion 11 in the plate thickness direction and have a circular cylinder shape. The circular cylinder portion 12 is formed by half blanking in the plate thickness direction of the outer peripheral end of the circular disk portion 11. An inner peripheral face of the circular cylinder portion 12 is formed with inner peripheral teeth faces 12a and convex faces 12b. The inner peripheral teeth faces 12a and the convex faces 12b are arranged alternately in a circular direction. The inner peripheral teeth faces 12a have inner teeth. The convex faces 12b project from the inner peripheral face of the circular cylinder portion 12 in a radial direction more than the inner peripheral teeth faces 12a. The convex faces 12b does not have inner teeth and constitute curved faces. The convex faces 12b are formed at positions of two portions of the circular cylinder portion 12 constituting axis symmetry.

Figure 6:
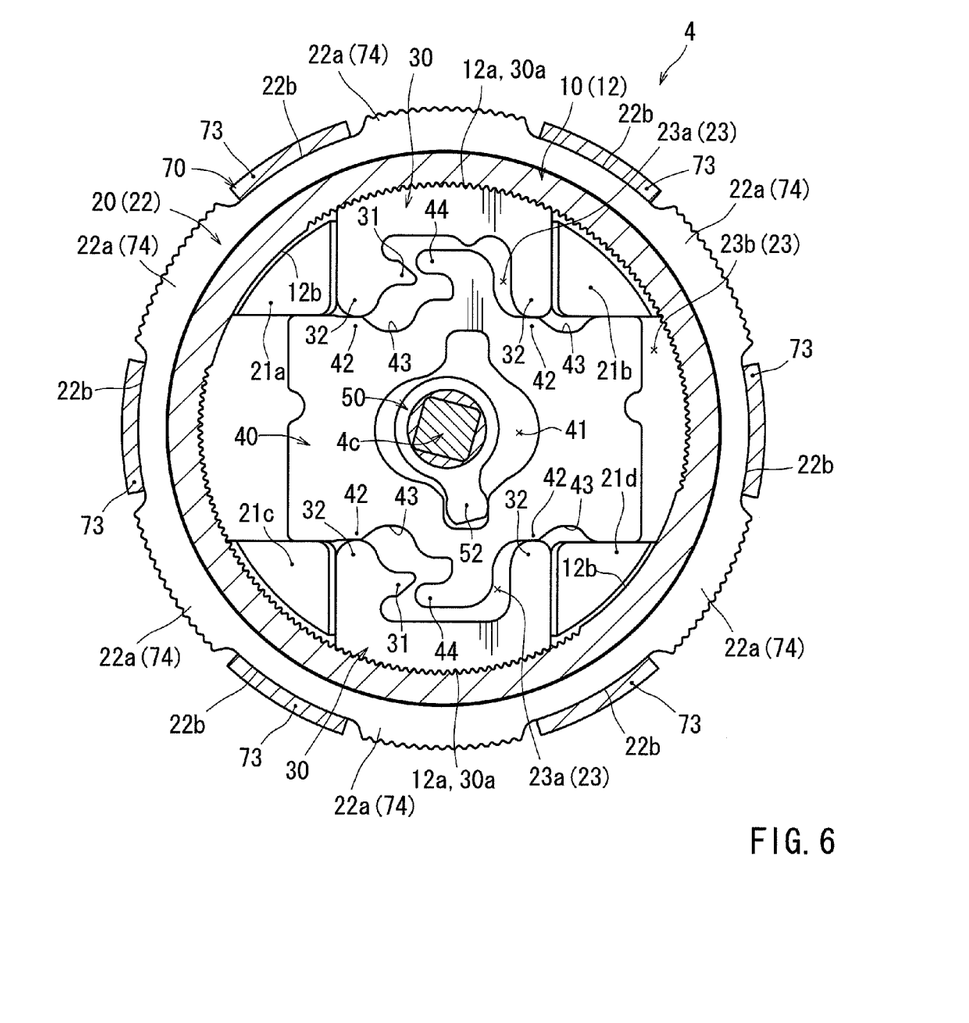
FIG. 6 is a cross-sectional view taken along line VI-VI in FIG. 4 for showing a locking state of the reclining apparatus.

As shown in FIG. 6, when the convex faces 12b are located at positions in a circular direction in which the convex faces 12b does not interfere with each pole 30, each pole 30 is allowed to move in an outer radial direction to mesh with the inner peripheral teeth face 12a of the ratchet 10. Thereby, the lock zone is set at the rotational angle region where the convex faces 12b does not interfere with each pole 30 and each pole 30 is allowed to mesh with the inner peripheral teeth face 12a of the ratchet 10.

On the other hand, when the convex faces 12b are located at positions in a circular direction in which the convex faces 12b interfere with each pole 30, the each pole 30 is prevented to move in the outer radial direction to mesh with the inner peripheral teeth face 12a of the ratchet 10. Because the each pole 30 touches on the convex faces 12b. Thereby, the free zone is set at the rotational angle region where the convex faces 12b interfere with each pole 30 and each pole 30 is prevented to mesh with the inner peripheral teeth face 12a of the ratchet 10.

Figure 4:
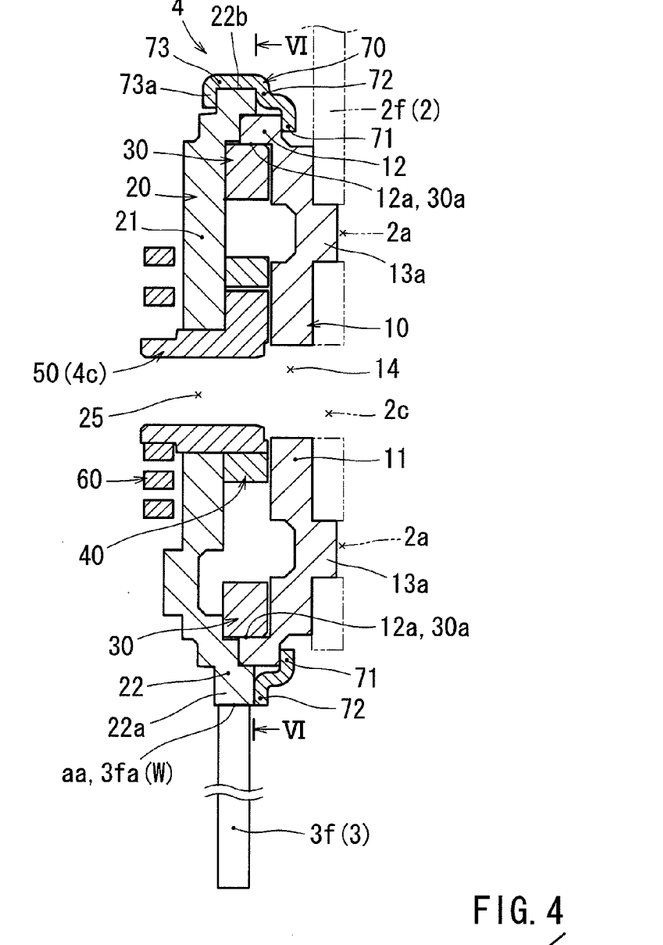
FIG. 4 is a cross-sectional view taken along line IV-IV in FIG. 3.

As shown in FIG. 4, an outer disk face of the circular disk portion 11 is attached to a disk face of the back frame 2f constituting a frame of the seat back 2. Thus, the ratchet 10 is integrally attached to the seat back 2. The back frame 2f constitutes a second object member of the present invention.

As shown in FIG. 1, the circular disk portion 11 of the ratchet 10 is formed with a plurality of dowels 13a and a D dowel 13b. The dowels 13a are projected in shapes of circular cylinders from an outer disk face of the circular disk portion 11. The dowels 13a and the D dowel 13b are formed by half blanking in the plate thickness direction. The dowels 13a and the D dowel 13b are aligned at equal intervals in a circumferential direction at positions proximate to an outer peripheral edge of the circular disk portion 11. The D dowel 13b is provided with a section having a D shape notching a portion of the shape of the projected circular cylinder and differs from the dowels 13a having a projected circular cylinder shape thereof.

As shown in FIG. 4, the back frame 2f is penetrated in the plate thickness direction to form with slits 2a having circular shapes and a D slit, not illustrated. The slits 2a and D slit are capable of being fitted with the dowels 13a and 13b. Therefore, by respectively fitting the dowels 13a and 13b to the slits 2a and the D slit of the back frame 2f and bonding these by welding, the ratchet 10 is integrally attached solidly to the back frame 2f.

The through hole 14 is inserted with the operating shaft 4c (refer to FIG. 2) for switching locking and releasing of the reclining apparatus 4. Also the back frame 2f is formed with a through hole 2c of the same object at a position on an axis line the same as that of the through hole 14.

As shown in FIG. 1, the guide 20 is provided with a shape of an approximate circular disk having an outer diameter one size larger than that of the ratchet 10. An outer peripheral edge of the circular disk portion 21 of the guide 20 is formed with a circular cylinder portion 22 projected in a shape of a circular cylinder in the plate thickness direction constituting a direction of being integrated to the ratchet 10. The circular cylinder portion 22 is formed by subjecting the outer peripheral edge of the circular disk portion 21 to half blanking in the plate thickness direction.

The outer peripheral edge of the circular cylinder portion 22 is formed with six protruding portions 22a protruding outward in a radial direction. The protruding portions 22a are located at approximate equal intervals in a circumferential direction. Thus, the outer peripheral edge of the circular cylinder portion 22 is formed concave portions 22b recessed relative to the protruding portions 22a at positions between the protruding portions 22a. The protruding portions 22a and concave portions 22b are arranged alternatively in the circumference direction. The outer peripheral surface of each protruding portion 22a is formed with outer teeth portions (mesh teeth aa). Each tooth of the outer teeth portions is arranged in the circumference direction.

The circular cylinder portion 22 of the guide 20 has the inner surface having one size larger than the circular cylinder portion 12 of the ratchet 10. The cylinder portion 12 of the ratchet 10 is integrated into the cylinder portion 22 of the guide 20. Thus, the guide 20 and the ratchet 10 can be rotated relatively by sliding of the circular cylinder portions 12 and 22 relatively.

The guide 20 and the ratchet 10 face each other in the plate thickness direction. The guide 20 is integrated to the ratchet 10 by the holding member 70. The holding member 70 straddles the outer peripheral portions of the guide 20 and the ratchet 10. The holding member 70 holds the guide 20 and the ratchet 10 to prevent the detachment thereof in the plate thickness direction. The holding member 70 is formed with six opening portions 74. The guide 20 has the six protruding portions 22a at the circular cylinder portion 22. The each protruding portion 22a is inserted into the each opening portion 74.

Figure 3:
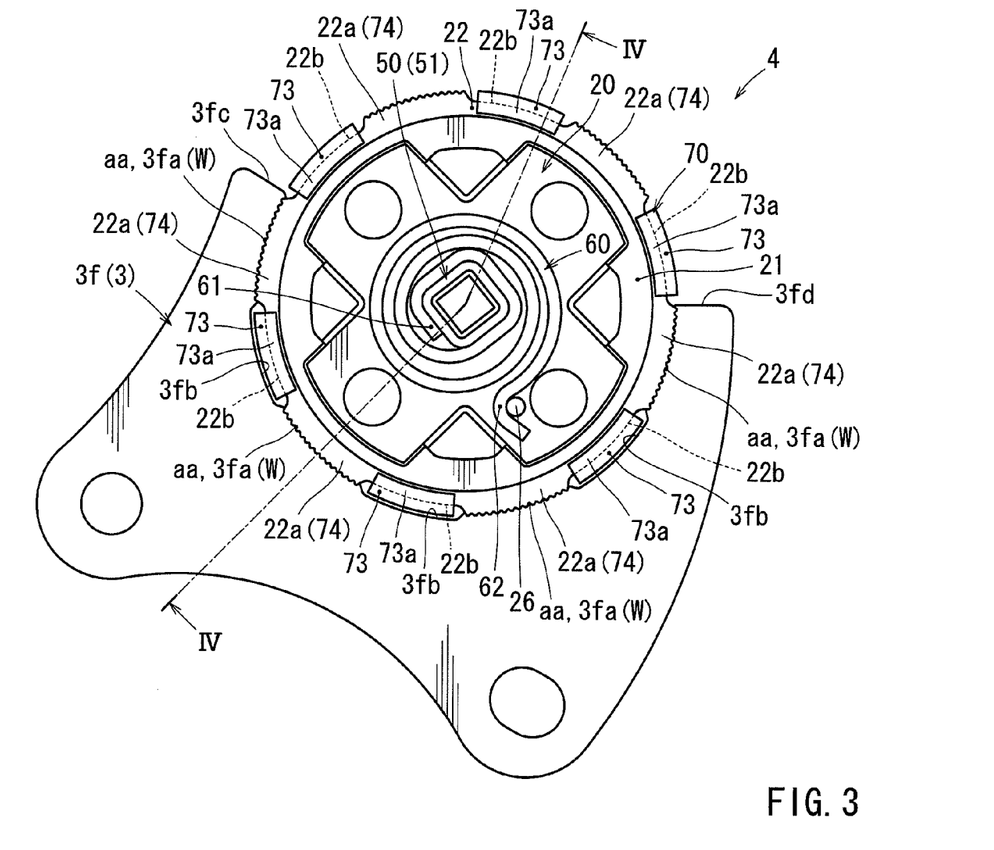
FIG. 3 is a side view of the reclining apparatus and a cushion frame.

As shown in FIGS. 1 and 3, the seat cushion 3 includes a cushion frame 3f constituting a frame of the seat cushion 3. The cushion frame 3f is a plate formed in a U-shape. An opening portion is formed at an upper end of the cushion frame 3f. An inner circumference surface of the opening portion is formed in a curved shape to receive the guide 20. The inner circumference surface is provided with inner teeth portions (mesh teeth 3fa) and recess portions 3fb.

The guide 20 is inserted into the opening portion of the cushion frame 3f in the plate thickness direction. Each protruding portion 22a of the guide 20 has an outer circumference surface corresponding to the inner teeth portion (mesh teeth 3fa) of the cushion frame 3f. Thereby, four of the six protruding portions 22a face and contact with the inner teeth portions (mesh teeth 3fa) in a radial direction. The mesh teeth aa of the protruding portions 22a mesh with the mesh teeth 3fa of the cushion frame 3f. Thereby, the guide 20 is prevented from rotating in respect of the cushion frame 3f.

As shown in FIGS. 1 and 3, the holding member 70 includes holding pieces 73. The holding pieces 73 extend in an axial direction and are inserted into the concave portions 22b of the guide 20. Three of the holding pieces 73 are inserted into the recess portions 3fb of the cushion frame 3f respectively. Thus the recess portions 3fb allow the holding pieces 73 to avoid interference with the cushion frame 3f.

Figure 5:
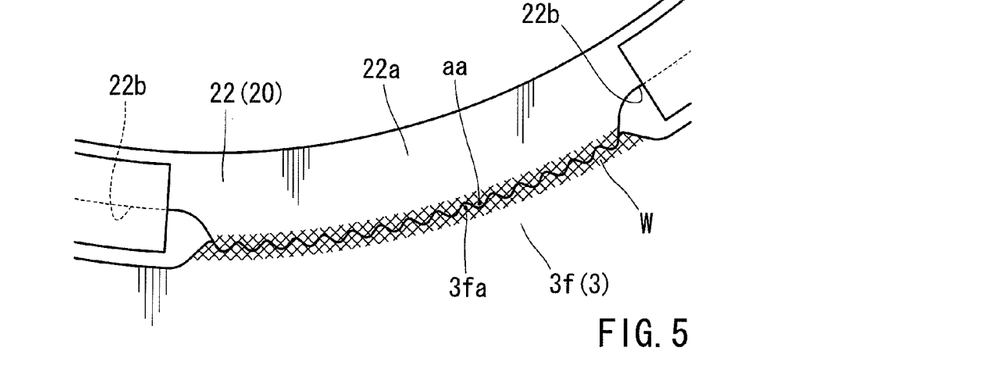
FIG. 5 is a view showing welding portions of mesh teeth welded by a laser welding.

The mesh teeth 3fa of the cushion frame 3f face with the mesh teeth aa of the guide 20. The facing portions of the mesh teeth 3fa and aa are jointed by a laser welding. Thus, the guide 20 and the cushion frame 3f are strongly coupled integrally by the laser welding. The laser beam for the laser welding is applied along the facing portion of the mesh teeth 3fa and aa in the plate thickness direction. As shown in FIG. 5, a width of a weld bead W formed by the laser beam is wider than a distance between teeth bottoms of the mesh teeth 3fa and aa.

The laser beam is applied on every region of the mesh teeth 11 and 3fa. Thus, the mesh teeth 11 and 3fa are strongly attached by not only meshing thereof but also being welded thereof. The seat cushion 3f constitutes a first object member of the present invention.

As shown in FIG. 3, the cushion frame 3f includes a forward falling down stopper 3fc and a rearward falling down stopper 3fd. The forward falling down stopper 3fc is formed at the left upper end of the cushion frame 3f in FIG. 3 for preventing the seat back 2 from falling down forward. The rearward falling down stopper 3fd is formed at the right upper end of the cushion frame 3f in FIG. 3 for preventing for the seat back 2 from falling down rearward. The back frame 2f of the seat back 2 is provided with a stopper piece not illustrated fixedly. When the seat back 2 rotates forward or rearward, the stopper piece moves along with the seat back 2 and contacts with the forward falling down stopper 3fc or the rearward falling down stopper 3fd so that the movement of the seat back 2 is restricted.

As shown in FIG. 1, a center of the circular disk portion 21 of the guide 20 is formed with a through hole 25. The through hole 25 is inserted into the operating shaft 4c (refer to FIG. 2) for carrying out the switching operation of locking and releasing of the reclining apparatus 4.

As shown in FIGS. 1 and 6, a circular disk portion 21 of the guide 20 is formed with a guide groove 23 recessing an inner disk face a shape of a sign '+' in the plate thickness direction. The guide groove 23 is formed by subjecting the circular disk portion 21 to half blanking in the plate thickness direction in the shape of the sign '+'. The guide groove 23 includes pole grooves 23a on an upper side and a lower side of FIG. 6 and the respective poles 30 are slidably contained in the pole grooves 23a.

As shown in FIG. 6, the pole grooves 23a guide the poles 30 by guide walls 21a through 21d constituting side walls on both left and right sides. The poles 30 slide only to inner and outer sides in a radial direction of the guide 20 (up and down direction of illustration) along groove shapes of the pole grooves 23a. The guide groove 23 includes the pole grooves 23a and a slide cam groove 23b in one connection. The slide cam groove 23b is extended in a left and right transverse direction of FIG. 7 and can slidably contain the slide cam 40 inside thereof.

The slide cam groove 23b guides the slide cam 40 by the guide walls 21a through 21d constituting the side walls on the both upper and lower sides. The slide cam 40 slides only in a left and right direction of FIG. 7 orthogonal to the direction of sliding the poles 30 relative to the guide 20 along a groove shape of the slide cam groove 23b. As shown in FIG. 1, the circular disk portion 21 of the guide 20 is formed with spring hanging portions 26 projected in shapes of pins from an outer disk face thereof. An outer end 62 of the coil spring 60 is hung on the spring hanging portions 26. The spring hanging portions 26 are formed at two portions in a circumferential direction to be able to select a hanging position.

The poles 30 are contained at inner portions of the respective pole grooves 23a formed at the guide 20. The poles 30 are provided with shapes approximately symmetrical with each other in an up and down direction. Outer peripheral edges of the respective poles 30 are provided with shapes bent in a shape of a circular arc matching with an inner peripheral face of the circular cylinder portion 12 of the ratchet 10. Outer peripheral faces thereof bent in the shape of the circular arc are formed with outer peripheral teeth faces 30a having outer teeth capable of being meshed with the inner peripheral teeth faces 12a formed at the inner peripheral face of the circular cylinder portion 12.

Therefore, as shown in FIG. 6, the respective poles 30 are pressed by the slide cam 40 to be operated to slide to outer sides in a radial direction, thereby, the respective outer peripheral teeth faces 30a are pressed to the inner peripheral teeth faces 12a of the ratchet 10 to be meshed therewith. Thereby, the respective poles 30 and the ratchet 10 are brought into a state of being locked in a circumferential direction by forces of being meshed with each other. However, the respective poles 30 can slide only to inner and outer sides in the radial direction by being guided by the guide walls 21a through 21d in a relationship thereof with the guide 20.

Figure 7:
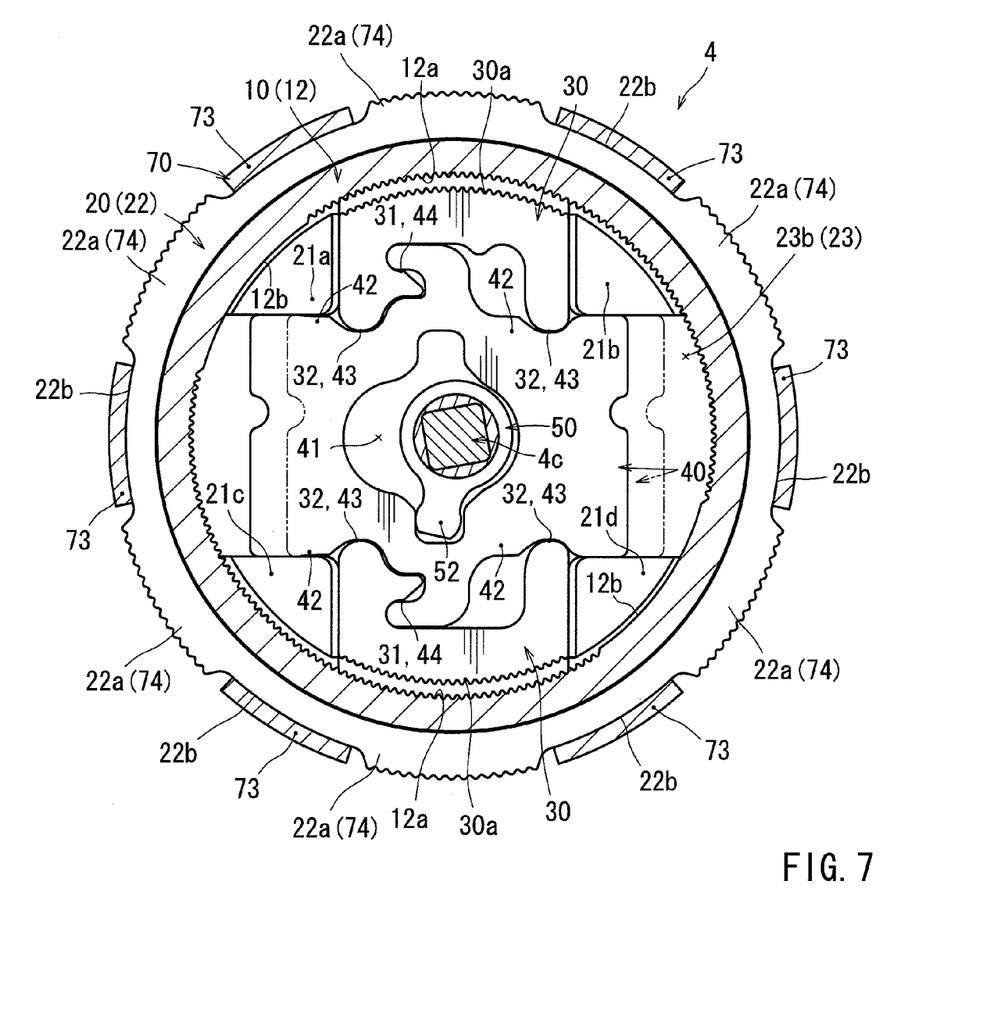
FIG. 7 is a cross-sectional view of the reclining apparatus for showing a lock releasing state of the reclining apparatus.

Therefore, a rotational movement of the ratchet 10 is restricted relative to the guide 20 by way of the respective poles 30. Thereby, rotation of the reclining apparatus 4 is locked. As shown in FIG. 7, the state of locking the rotation of the reclining apparatus 4 is released by being released from being meshed with the ratchet 10 by pulling the respective poles 30 to inner sides in the radial direction.

An operation of sliding the respective poles 30 to inner and outer sides in the radial direction is carried out by an operation of sliding the slide cam 40 arranged between the poles 30. As shown in FIG. 6, the slide cam 40 is contained in the slide cam groove 23b formed at the guide 20. The slide cam 40 is provided with a shape symmetric in the up and down direction. Upper and lower edges of the slide cam 40 are provided with shoulder portions 42 for pushing out the respective poles 30 to outer sides in the radial direction and hooks 44 for pulling the respective poles 30 to inner sides in the radial direction.

The poles 30 are provided with a gate-type shape of partially hollowing a shape on an inner side in the radial direction. The respective poles 30 are pushed to outer sides in the radial direction by the slide cam 40 by bringing leg portions 32 constituting two legs of the gate type into contact with upper and lower edges of the slide cam 40. Specifically, as shown in FIG. 6, the respective poles 30 are pushed out to the outer sides in the radial direction by abutting the respective leg portions 32 to the respective shoulder portions 42 by sliding the slide cam 40 to a right side.

Thereby, the outer peripheral teeth faces 30a of the respective poles 30 are meshed with the inner peripheral teeth faces 12a of the ratchet 10. As shown in FIG. 7, the poles 30 include hanging portions 31 on an inner side of the gate type, by sliding the slide cam 40 to a left side, the hooks 44 of the slide cam 40 are caught by the hanging portions 31, and the respective poles 30 are pulled to inner sides in the radial direction. The respective poles 30 are released from being meshed with the ratchet 10 by pulling the respective leg portions 32 to inner portions of groove portions 43 formed at right positions of the respective shoulder portions 42.

The respective groove portions 43 are smoothly recessed from the respective shoulder portions 42. Thereby, as shown in FIG. 6, according to the respective poles 30, the slide cam 40 is slid to the right side, and the leg portions 32 ride over the respective shoulder portions 42 by being guided to move along shapes of inclined faces of the respective groove portions 43. The hinge cam 50 is engaged to inside of the cam hole 41 penetrated to form at the center portion of the slide cam 40. A rotating of the hinge cam 50 carries out an operation of sliding the slide cam 40 in a left and right direction.

As shown in FIG. 1, the hinge cam 50 is always biased in the clockwise direction by a bias force of the bias spring (coil spring) 60 hung between the hinge cam 50 and the guide 20. As shown in FIG. 3, an inner end 61 of the coil spring 60 is hung on a spring hanging portion 51 of the hinge cam 50 in a state of being twisted previously, and the outer end 62 is hung on the spring hanging portion 26 of the guide 20.

Thereby, as shown in FIG. 6, the hinge cam 50 presses the slide cam 40 from a side of an inner peripheral face of the cam hole 41 to slide to the right side always by an operating projection 52 projected to be formed at an outer peripheral portion thereof. Thereby, the respective poles 30 are normally brought into a state in which the respective leg portions 32 ride over the respective shoulder portions 42 of the slide cam 40 to be meshed with the ratchet 10.

The hinge cam 50 is integrally connected to the operating shaft 4c shown in FIG. 2. Thereby, the hinge cam 50 is pivoted in the counterclockwise direction of FIG. 1 (clockwise direction of FIG. 6) against a biasing of the coil spring 60 by pulling up the operating lever 5 (refer to FIG. 2). Thereby, as shown in FIG. 7, the slide cam 40 is slid to the left side and the respective poles 30 are released from being meshed with the ratchet 10.

As shown in FIG. 1, the holding member 70 is formed by punching a thin steel sheet in a ring-like shape and is formed in a cylindrical shape by a half blanking process in the axial direction. The holding member 70 is provided with a first bottom face 71 and a second bottom face 72. The first bottom face 71 extends inwardly in the radial direction from one end of the holding member 70. The second bottom face 72 extends outwardly in the radial direction from a center portion of the holding member 70. The bottom faces 71 and 72 are formed in flange shapes to face in the axial direction. A stepped difference in the axial direction is formed between the bottom faces 71 and 72.

As shown in FIG. 4, the ratchet 10 and the guide 20 are inserted into the holding member 70 in the axial direction. Thereby the first bottom face 71 faces the outer disk face of the cylinder portion 12 of the ratchet 10. And the second bottom face 72 faces the inner disk face of the cylinder portion 22 of the guide 20. As shown in FIG. 1, an outer peripheral edge of the second bottom face 72 is provided with holding pieces 73. The holding pieces 73 protrude in the axial direction from six portions of the second bottom face 72. The holding pieces 73 are arranged at substantial equal intervals in the circumference direction. The holding member 70 is formed with opening portions 74 between the holding pieces 73. The opening portions 74 are arranged in the circumference direction and open in the radial direction.

The holding pieces 73 are arranged at intervals in a circumference direction. The holding pieces 73 are formed in shapes of circular arcs to form a substantial cylinder shape. The holding pieces 73 are inserted into the concave portions 22b formed at the outer peripheral edge of the guide 20 and cover the concave portions 22b. The tip ends of the holding pieces 73 protrude from the concave portions 22b of the guide 20, and the tip ends (bent portion 73a) are bent (or calked) to the inner side in the radial direction. Thereby, the holding member 70 holds the guide 20 and the ratchet 20 in an axial direction (refer to FIG. 4).

The opening portions 74 of the holding member 70 open the protruding portions 22a of the guide 20, and the protruding portions 22a protrude toward outer in a radial direction through the opening portions 74. As shown in FIG. 1, the first bottom face 71 is formed with projected portions 71a projected toward the ratchet 10. Thereby, the ratchet 10 is positioned in the axial direction relative to the holding member 70 by contacting of the circular cylinder portion 12 to the projected portions 71a.

The holding member 70 includes a cylinder portion for connecting the first bottom face 71 to the second bottom face

72. The cylinder portion covers an outer peripheral edge of the cylinder portion 12 of the ratchet 10. The poles 30, the slide cam 40 and the other parts are mounted onto the circular disk portion 11 of the ratchet 10. The guide 20 is inserted into the holding member 70, and the inner disk face of the cylinder portion 22 contacts with the second bottom face 72. Thereby, the guide 20 is positioned in the axial direction relative to the holding member 70.

As shown in FIG. 4, the second bottom faces 72 of the holding member 70 extend outward in the radial direction, and face the cylinder portion 22 of the guide 20. Further, the holding pieces 73 of the holding member 70 face the outer peripheral surface of the cylinder portion 22.

The holding pieces 73 of the holding member 70 is bent in an inner radial direction. Thus the holding member 70 may bind the ratchet 10 and the guide 20 in the axial direction and prevent for the ratchet 10 and the guide 20 from being detached from the holding member 70.

The cylinder portion 12 of the ratchet 10 is positioned between the circular disk portion 21 of the guide 20 and the first bottom face 71 of the holding member 70 with a small space in the axial direction. Thus, the rotation of the ratchet 10 relative to the guide 20 may be carried out smoothly because obstruction by sliding friction between the ratchet 10 and the holding member 70 may be small.

As described above, the guide 20 is attached to the cushion frame 3$f$ by four protruding portions 22$a$. The protruding portions 22$a$ are located at radial outer portions of the guide 20. Thereby, the guide 20 may be strongly attached to the cushion frame 3$f$ because torque applied to the guide 20 from the cushion frame 3$f$ is relatively large. Further, the protruding portions 22$a$ contact with the seat cushion 3$f$ in the radial direction and are welded to the seat cushion 3$f$. Thereby, the thickness of the connecting apparatus including the reclining apparatus 4 and the cushion frame 3$f$ in the plate direction may be thinner in comparing with a configuration in that the guide 20 contacts with the cushion frame 3$f$ in the thickness direction.

The protruding portions 22$a$ of the guide 20 are attached to the cushion frame 3$f$ by the laser welding. Thus, the weight of the connecting apparatus may be lighter in comparing with a configuration in that the guide 20 is attached to the cushion frame 3$f$ by an arc welding or bolts because the arc welding or bolts would add weight to the connecting apparatus. The protruding portions 22$a$ face the cushion frame 3$f$ in the radial direction. The laser beam is applied from one side of the thickness direction to front surfaces of the protruding portions 22$a$ and the cushion frame 3$f$. As shown in FIG. 4, the laser welding forms a weld bead W by melting a part of the guide 20 and the cushion frame 3$f$. A back wave of the weld bead W appears on back surfaces (edge face) located on the other side of the front surfaces of the protruding portions 22$a$ and the first object member 3$f$. Thus, it is easy to check whether the laser welding is precisely carried out or not by checking the back wave.

The protruding portions 22$a$ of the guide 20 and the cushion frame 3$f$ have mesh teeth aa and 3$fa$ meshed each other. A width of the weld bead W is wider than a radial distance between the teeth bottoms of the mesh teeth aa and 3$fa$. Thus, the guide 20 may be strongly attached to the cushion frame 3$f$ by not only the mesh teeth aa and 3$fa$ but also the welding portions around the mesh teeth aa and 3$fa$.

Thus, the guide 20 is attached to the cushion frame 3$f$ strongly enough even if the guide 20 is attached to the cushion frame 3$f$ only at a part of the circumference portion thereof. Thereby, the cushion frame 3$f$ may be configured with small size.

Figure 8:
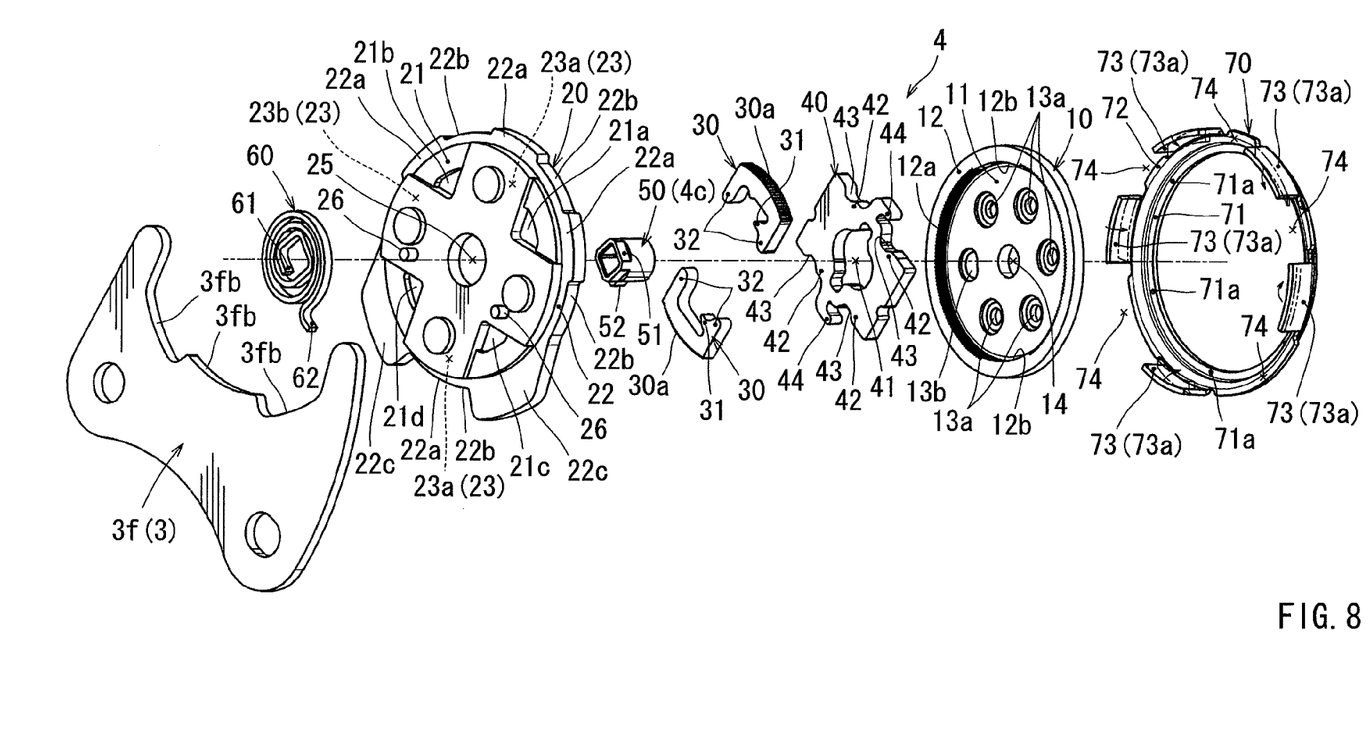
FIG. 8 is a an exploded perspective view of a reclining apparatus of another configuration.

Another configuration according to the present invention will be described in reference to FIGS. 8 to 10. This configuration is similar to the one shown in FIGS. 1 to 7. However, a guide 20 as shown in FIG. 8 includes three protruding portions 22$a$ and fin portions 22$c$ formed at an outer edge of cylinder portion 22. The fin portions 22$c$ protrude longer than the protruding portions 22$a$ in a radial direction. The fin portions 22$c$ constitute protruding portions of the present invention.

The each fin portion 22$c$ is wider than the protruding portion 22$a$ in a circumference direction. The guide 20 is inserted into the opening portion of the cushion frame 3$f$ in the plate thickness direction as shown in FIG. 9. Thereby, the fin portions 22$c$ are fit into the recess portions 3$fb$ formed at the inner surface of the opening, and the outer surfaces of the fin portions 22$c$ contact with the inner surfaces of the recess portions 3$fb$.

Figure 10:
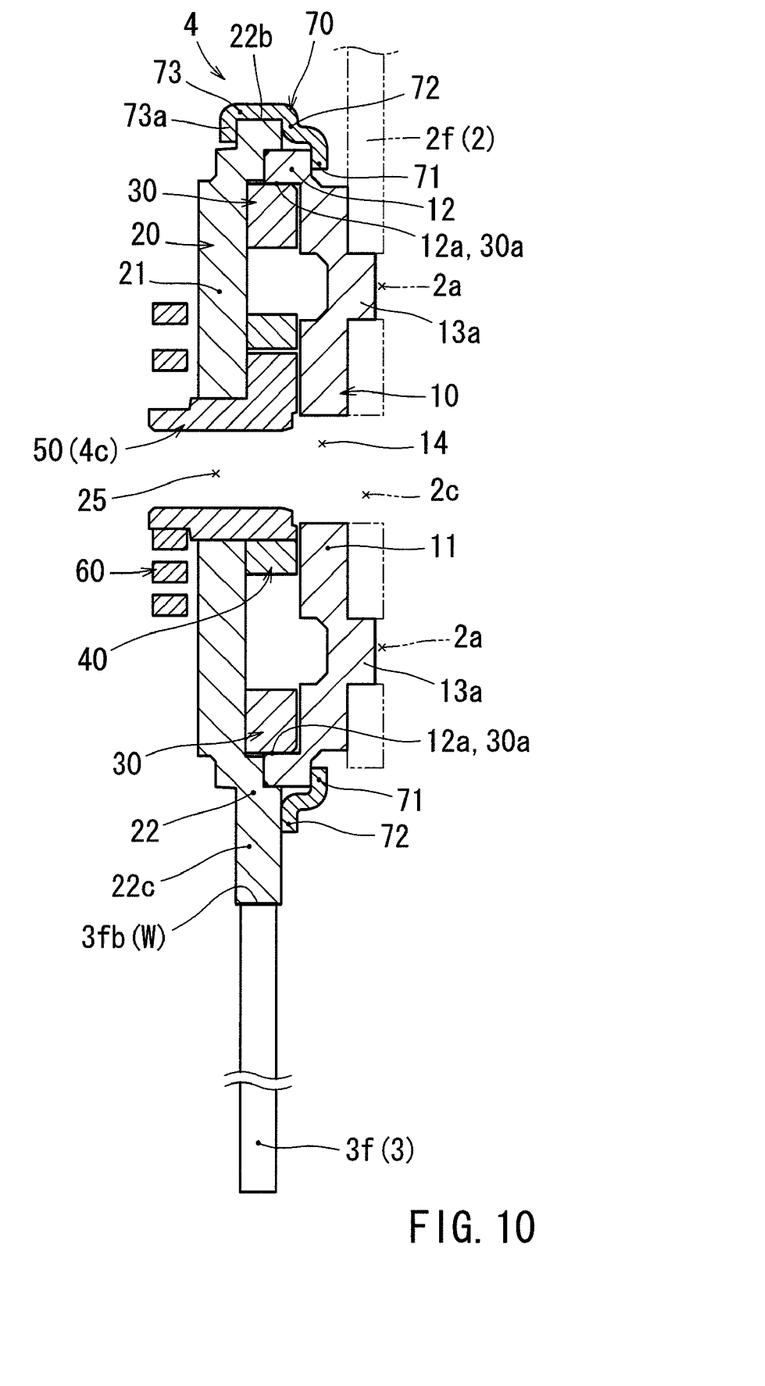
FIG. 10 is a cross-sectional view taken along line X-X in FIG. 9.

The contacting portions of the fin portions 22$c$ and the recess portions 3$fb$ are welded by the laser welding (refer to FIG. 10). The fin portions 22$c$ are located at the outer portion of the guide 20 in the radial direction. The fin portions 22$c$ are fit into the recess portions 3$fb$. And the fin portions 22$c$ face the recess portions 3$fb$ in the radial direction. Thus, the guide 20 is strongly attached to the cushion frame 3$f$.

While the invention has been described with reference to specific configurations, it will be apparent to those skilled in the art that many alternatives, modifications and variations may be made without departing from the scope of the present invention. Accordingly, the present invention is intended to embrace all such alternatives, modifications and variations that may fall within the spirit and scope of the appended claims. For example, the above aspects should not be limited to those configurations, but may be modified as described below.

In FIGS. 1 to 10, the reclining apparatus 4 (connecting apparatus) of the vehicular seat is configured to connect the seat back 2 to the seat cushion 3 adjustably a back rest angle. However, the connecting apparatus may be configured to connect the seat back 2 to a vehicular floor adjustably at a back rest angle. Or the connecting apparatus may be configured to rotatably connect the seat body to the vehicular floor. Or the connecting apparatus may be configured to rotatably connect an ottoman device to the seat cushion 3 or the vehicular floor. The ottoman device is rotated to lift leg regions of a user sitting in the seat.

In FIGS. 1 and 8, the connecting apparatus includes the ratchet 10 and the poles 30. The inner peripheral teeth faces 12$a$ of the ratchet 10 engage the outer peripheral teeth faces 30$a$ of the poles 30 to prevent for the ratchet 10 and the guide 20 from rotating relatively. However, the connecting apparatus may be what is called no step type reclining apparatus including an outer teeth member (connecting member) having an outer gear and an inner teeth member (connecting member) having an inner gear as described in Japanese Laid-Open Patent Publication No. 2008-18055. The outer teeth member is rotated on an inner teeth face of the inner gear and revolves around a center of the inner teeth member. By applying a force in a direction for meshing the gears, the relative rotation of the teeth members may be restricted.

In FIGS. 1 and 8, the connecting apparatus includes two poles 30 and the slide cam 40 capable of moving two poles 30. However, the connecting apparatus may include over three poles and a rotational cam capable of moving the poles as described in Japanese Laid-Open Patent Publication No. 2005-312891.

Figure 9:
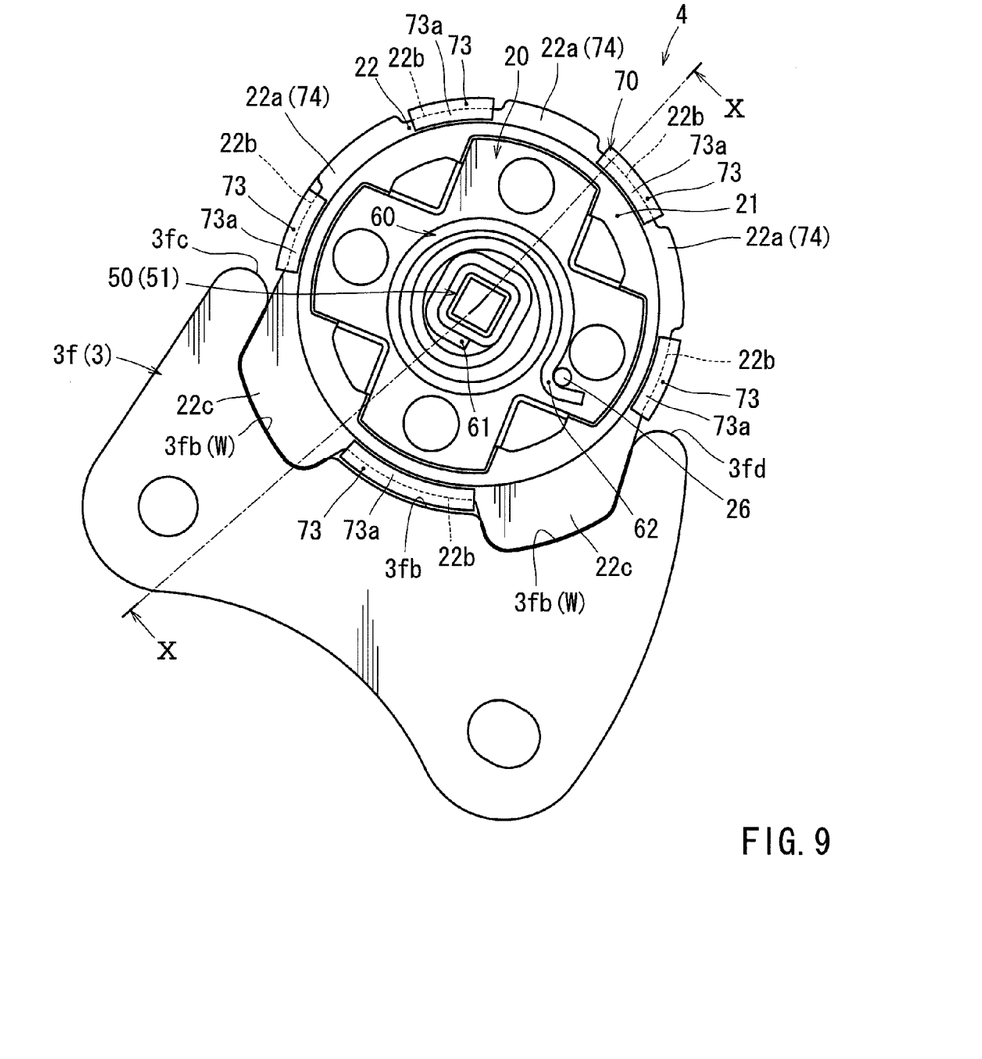
FIG. 9 is a side view of the reclining apparatus and a cushion frame.

In FIGS. 3 and 9, the guide 20 (connecting member) and the cushion frame 3$f$ (object member) are attached by the laser welding. However, they may be attached by means of an arc welding, bolts or other attaching means.

In FIGS. 1 and 8, the guide 20 (connecting member) and the ratchet 10 (connecting member) rotatably support each other by the cylinder portions 22 and 12 fitted to each other. However, it can be configured in a way that the support member 70 integrates the guide 20 and the ratchet 10, the ratchet 10 is provided with protruding portions (fin portions), and the ratchet 10 is attached to the back frame 2*f* by the protruding portions.

In FIGS. 1 and 8, the cylinder portion 12 of the ratchet 10 is fit into the cylinder portion 22 of the guide 20 to be supported by the guide 20. However, it can be configured in a way that the ratchet 10 includes a cylinder portion located at an outer side in the radial direction than the guide 20, the guide 20 is supported by the cylinder portion of the ratchet 10, the cylinder portion is provided with protruding portions, the protruding portions extend through openings of the holding member 70, and some of the protruding portions are attached to the seat back.

What is claimed is:

1. A connecting apparatus for a vehicle comprising:
    a first object member and a second object member;
    a first connecting member and a second connecting member integrated in a plate thickness direction thereof to be able to rotate relative to each other, the first connecting member integrally attached to the first object member, the second connecting member integrally attached to the second object member; and
    a holding member straddling outer peripheral surfaces of the first connecting member and the second connecting member, and holding the first and second connecting members to stop detachment thereof in the plate thickness direction, wherein
    the holding member is provided with an opening portion, the first connecting member is provided with a protruding portion, the protruding portion extends through the opening portion in a radial direction, is attached to the first object member, faces the first object member in the radial direction and is welded to the first object member.

2. The connecting apparatus as in claim 1, wherein
    the protruding portion and the first object member are welded by a laser beam applied from one side of the plate thickness direction to front surfaces of the protruding portion and the first object member, and wherein
    back surfaces located opposite the front surfaces of the protruding portion and the first object member are provided with a back wave of the laser welding.

3. The connecting apparatus as in claim 1, wherein the protruding portion includes mesh teeth meshed with mesh teeth of the first object member.

4. The connecting apparatus as in claim 3, wherein
    the mesh teeth of the protruding portion and the mesh teeth of the first object member are welded to each other, and wherein
    a width of a weld bead formed by the weld is wider than a distance between teeth bottom of the mesh teeth of the protruding portion and teeth bottom of the mesh teeth of the first object member.

* * * * *